United States Patent [19]
Geraci

[11] 3,796,477
[45] Mar. 12, 1974

[54] LENS HOUSING AND LENS COVER FOR OBJECTIVE LENS RING OF AN OPERATING MICROSCOPE

[75] Inventor: James Leonard Geraci, Cincinnati, Ohio

[73] Assignee: Xomox Corporation, Cincinnati, Ohio

[22] Filed: Sept. 25, 1972

[21] Appl. No.: 292,148

[52] U.S. Cl. ............... 350/65, 350/318, 350/319
[51] Int. Cl. .......................................... G02b 23/16
[58] Field of Search .......... 350/61, 65, 67, 318, 319

[56] References Cited
UNITED STATES PATENTS

| | | |
|---|---|---|
| 3,528,720 | 9/1970 | Treace ............................ 350/61 |
| 3,698,791 | 10/1972 | Walchle et al. ................. 350/61 |
| 2,197,184 | 4/1940 | Kemp ............................. 350/58 |
| 3,133,140 | 5/1964 | Winchell ........................ 350/65 |
| 3,426,433 | 2/1969 | Anderson ...................... 350/65 X |

Primary Examiner—David H. Rubin
Attorney, Agent, or Firm—J. Warren Kinney, Jr.

[57] ABSTRACT

A flexible, resilient, distortable lens housing adapted to snugly receive the objective lens ring of the objective lens of an operating microscope is provided with a removable lens cover. The lens cover includes an easily accessible manipulative handle.

5 Claims, 10 Drawing Figures

PATENTED MAR 12 1974 3,796,477

LENS HOUSING AND LENS COVER FOR OBJECTIVE LENS RING OF AN OPERATING MICROSCOPE

BACKGROUND OF THE INVENTION

The field of the invention relates to a sterilized, disposable lens housing and associated lens cover for the objective lens ring of an operating microscope, and in particular, to an improvement in the structural details of the lens housing and lens cover carried thereby.

The improved lens housing is fabricated from flexible, resilient material and includes means for securely, though releaseably, positioning a removable lens cover relative to the objective lens of an operating microscope in such a manner that it, the lens cover, may be easily removed at the option of the practitioner without necessitating removal of the lens housing from the objective lens or lens ring of the microscope.

The subject lens housing and its associated lens cover may be used in combination with the objective lens ring of a microscope, or in conjunction with a sterilized, disposable drape for an operating microscope.

In the performance of certain surgical operations, such as, by way of example, a mastoid operation, it is not uncommon for bone fragments and blood to be splattered about. The lens housing and lens cover of the subject invention provide highly effective and efficient means for protecting the objective lens of a microscope from foreign particles, during an operation, and in the event that such foreign particles are deposited on the lens cover it is but a simple matter for the surgeon or operating room nurse to remove the blood splattered lens cover from the lens housing thereby providing the surgeon with a clear and unobstructed view of the field being observed. The structural details of the lens housing are such as to facilitate ease of removal, and if desired the association of another lens cover with the lens housing, thereby providing maximum protection and flexibility.

The lens housing of the subject invention is fabricated in such a manner as to provide an integrally formed, highly effective light shield or barrier which will greatly reduce, if not completely eliminate any reflection from the lens cover.

DESCRIPTION OF THE PRIOR ART

U. S. Pat. No. 3,698,791 dated Oct. 17, 1972, assigned to the assignee of this application, discloses a sterile drape for an operating microscope, which drape includes a lens ring housing having a lens cover for the objective lens of the microscope, said lens cover being fixedly secured to and comprising an integral part of the lens housing.

Richards Manufacturing Company, Inc. of Memphis, Tenn., is producing a microscope drape as disclosed in its Patent No. 3,528,720, wherein a circular piece of flat, transparent material is loosely secured to and carried by the objective lens ring structure 53 illustrated in FIG. 9 of said patent, wherein said circular piece is supported by the inwardly, radially projecting rim portion 61 on the lower circumferential body portion of annular body 55 of the objective lens ring structure 53. Even though said circular member is loosely associated with the aforesaid objective lens ring 53, it cannot be removed or disassociated from the lens ring once the drape has been associated in housing relationship with an operating microscope without destroying the lens ring structure 53, or without removing the entire drape from the microscope. The objective ring structure 53 of said patent is fabricated from thermo plastic material such as high impact styrene.

SUMMARY OF THE INVENTION

The lens housing and lens cover of the present invention is directed to an improvement of the structural details of and method of using a lens cover for the objective lens ring of an operating microscope, whether said lens housing be used separately or in conjunction with a sterilized, disposable drape for an operating microscope.

The lens housing is fabricated from easily distortable, flexible, resilient material, such as silicone, or the like, where-by to provide a housing for and from which the substantially rigid, transparent lens cover can be easily removed while the housing is mounted on the objective lens ring of a microscope.

PREFERRED EMBODIMENT OF THE INVENTION

Figure 2:
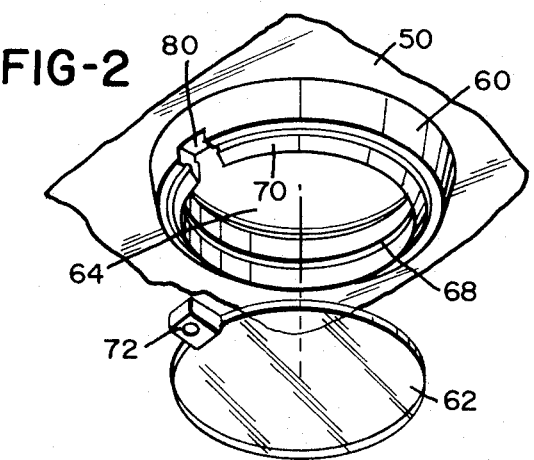
FIG. 2 is a perspective view of the lens housing and lens cover of the subject invention in conjunction with a portion of the drape of FIG. 1.
Figure 3:
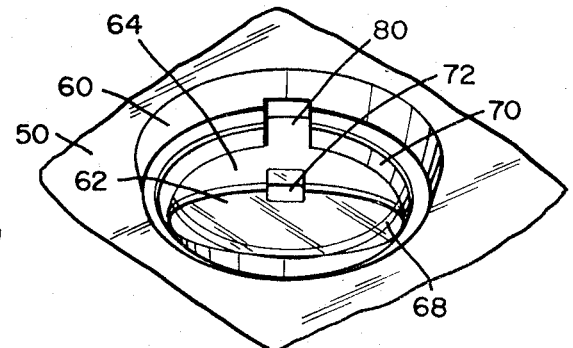
FIG. 3 is a view similar to FIG. 2 illustrating the lens cover being inserted into or removed from the lens housing.
Figure 4:
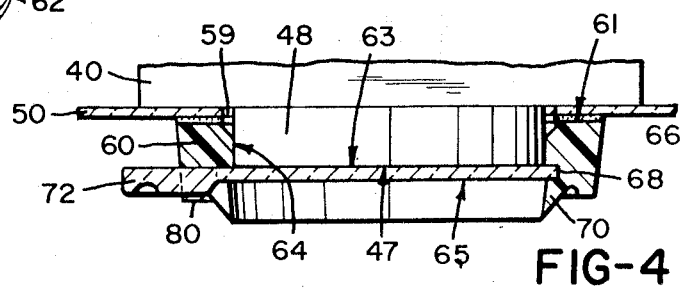
FIG. 4 is an enlarged view, partly in section, taken transversely through the lens housing and lens cover, illustrating the normal relationship thereof with the objective lens ring of a microscope housing.

With particular reference now to FIGS. 2, 3, and 4, the numeral 60 denotes generally a lens ring housing which is fabricated from a resilient material such as, by way of example, 70 Durometer PVC, and having therein an opening 64 defining an inner wall 64' which is dimensioned to snugly receive and frictionally engage the outer peripheral surface of the projecting objective lens ring 48 of the microscope housing 40. A circumferential groove 68 is provided in the inner wall 64' of the lens ring housing for the reception of the outer peripheral portions of an optically clear, transparent, distortion free, lens cover 62. Uniformly satisfactory results have been obtained in those instances in which lens cover 62 is fabricated from acrylic 0.050 thick.

The relationship of groove 68 to the upper or rear surface 61 of the lens ring housing is such that the upper or rear surface 63 of the lens cover will be disposed in abutting relationship with the lower surface 47 of the objective lens ring 48, as illustrated in FIG. 4.

Lens cover 62 is provided with an outwardly projecting tab or hand grip portion 72. A notched recess 80 is provided in the lens ring housing, note FIGS. 2, 3, and 4, for receiving hand grip portion 72 which is seated therein when the lens cover 62 is seated within groove 68 of the lens ring housing 60.

In those instances in which it becomes necessary or desirable to remove or disassociate the lens cover from the lens ring housing, the surgeon, technician or operating room nurse, may quickly, surely and effectively disassociate the lens cover from the lens housing merely by grasping hand grip 72 and pulling downwardly thereon. The inherent resilience of the lens ring housing will permit it to distort sufficiently to permit removal of the lens cover from groove 68 without disturbing the relationship between the objective lens ring 48 and housing 60.

In the preferred embodiment of the invention the lens housing is provided with an outwardly or forwardly projecting peripheral portion 70 which defines a glare shield which circumscribes and projects outwardly beyond outer surface 65 of lens cover 62. Member 70 effectively lessens the incidence of reflection into the objective lens of a microscope.

In those instances in which the surgeon is concerned with a localized sterile condition only immediately adjacent the field being observed through the microscope, the lens housing 60 and its associated lens cover 62 are adapted to be utilized, per se, for providing a localized sterile environment at the objective lens of the microscope, it being understood that a lens ring housing 60 with its lens cover 62 operatively associated therewith are provided in a sterile condition, such as, by way of example in a sterile envelope for use by the surgeon, operating nurse, etc.

However, a broader use of the lens ring housing and the lens cover of the present invention is presented in those instances in which they are associated with a sterile drape as disclosed in patent application, Ser. No. 135,108, wherein the lens housing and lens cover of the subject application replace the lens housing and lens disclosed in said pending application.

Figure 1:
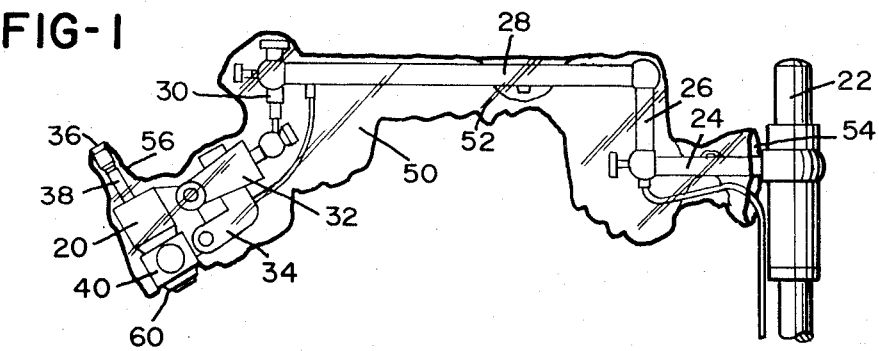
FIG. 1 is a schematic side view of a typical operating microscope having a disposable, sterile drape operably associated therewith.

With particular reference now to FIG. 1, the numeral 20 denotes generally a conventional operating microscope which is adjustably mounted relative to an upright 22, or other suitable support means by means of a support arm which, by way of example, may comprise a series of adjustably connected elements 24, 26, 28, 30, 32, and 34 which are articulated in such a manner as to enable the user of the microscope to adjust it in any desired position for enabling an observer looking into eyepiece 36 of ocular 38 to examine and study the contents of the field being observed, such as, by way of example, the eyes, ears, nose, throat, etc. of a patient. The microscope also includes an objective lens 40 and an illuminating lamp, not shown. It should be understood that the microscope in its entirety including its support arm assembly, is a standard piece of equipment and constitutes no part of the subject invention.

With further reference to FIG. 1, the numeral 50 denotes generally an elongate envelope or drape fabricated from a thin, preferably transparent, copolymer sheet material of the type which is capable of withstanding temperatures of 300°F without injurious effects. The drape comprises a substantially tubular member having an elongate body portion 52 which is open at one end 54, the other end terminates in one or more tubular extensions on sleeves 56 each dimensioned to telescopically receive an ocular 38 of the microscope. The objective lens includes an annular objective lens ring 48 that projects from the housing, see FIG. 4.

Lens ring housing 60 is fixedly secured, such as, by way of example, to an opening 59 in drape 50, by means of an adhesive 66, FIG. 4. Association of lens ring housing 60 with the objective lens ring 48 of the microscope provides an air tight seal between the lens ring and drape 50.

It will be noted that the aforesaid air tight relationship will continue to exist even though, and in the event that, the lens cover 62 is removed or disassociated from the lens ring housing 60.

In the construction illustrated in FIGS. 1–4, the resilient lens ring housing 60 is adapted to be distorted sufficiently to permit the seating and unseating of lens cover 62 relative to groove 68. Lens cover 62 may therefore be displaced bodily, as in FIG. 2, to expose the objective lens of the microscope, and due to the inherent resilient characteristics of the lens ring housing 60, it will accommodate objective lens rings of varying diametral dimensions.

Figure 5:
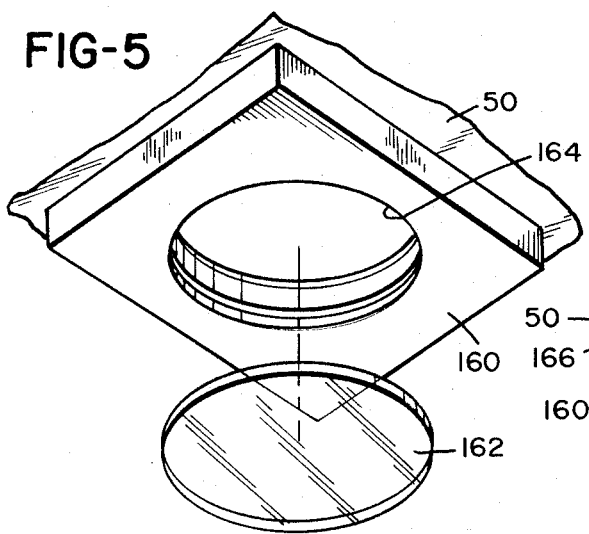
FIG. 5 is a perspective view similar to FIG. 2 showing a modification of the lens housing and lens cover.
Figure 6:
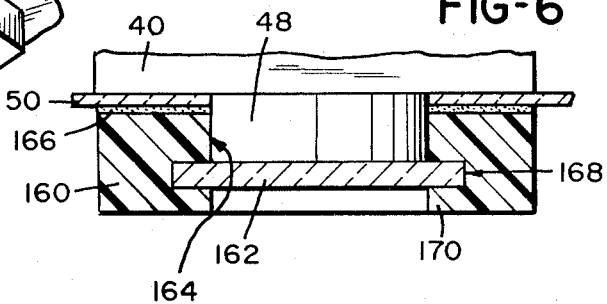
FIG. 6 is a view similar to FIG. 4 of the lens housing and lens cover of FIG. 5.

In the modification illustrated in FIGS. 5 and 6, the lens ring housing 160 is illustrated as comprising a rectangular member centrally apertured as at 164 and having an internal groove 168 to provide a seat for support of circular lens cover 162. The upper surface of the lens ring housing is secured, as best illustrated in FIG. 6, to the outer surface of drape 50 by means of an adhesive 166. The numeral 170 indicates a retaining flange 170 which is pliant and resilient to the degree that it will yield to permit the bodily insertion of the lens cover 162 and the seating of said cover within groove 160.

The primary distinction between the dvice of FIGS. 2–4 and FIGS. 5 and 6, resides in the fact that the lens cover of FIGS. 5 and 6 are not adapted to be as easily disassociated from the lens ring housing, as the lens cover of FIGS. 2–4.

Figure 7:
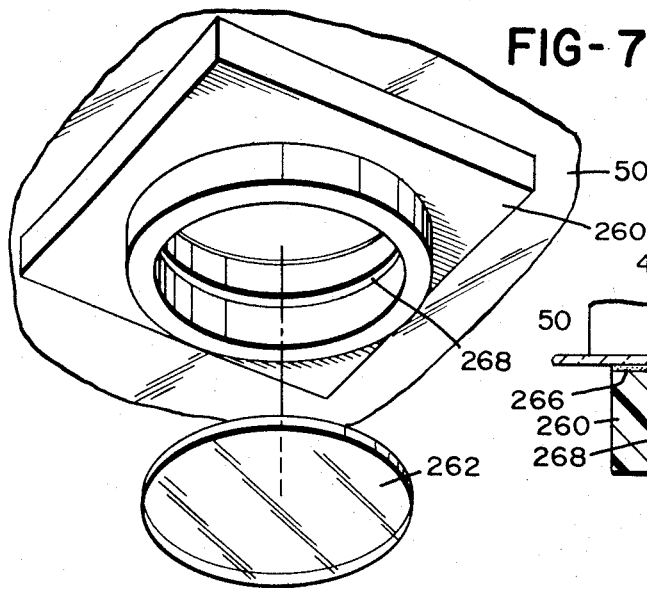
FIG. 7 is a perspective view similar to FIG. 2 showing a modified form of lens housing.
Figure 8:
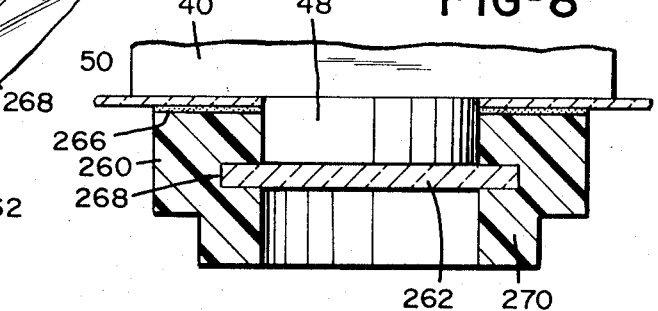
FIG. 8 is a view similar to FIG. 4 of the lens housing and lens cover of FIG. 7.

In the modification of FIGS. 7 and 8, the overall thickness of the lens ring housing 260 is such as to provide an annular, depending shield 270 of considerable depth whereby to minimize glare and reflection. As in the case of FIG. 6, the lens cover 262 is securely, though removably, supported in an internal groove 268, and the lens ring housing per se is fixedly secured to drape 50, such as, by way of means of adhesive 266.

Figure 9:
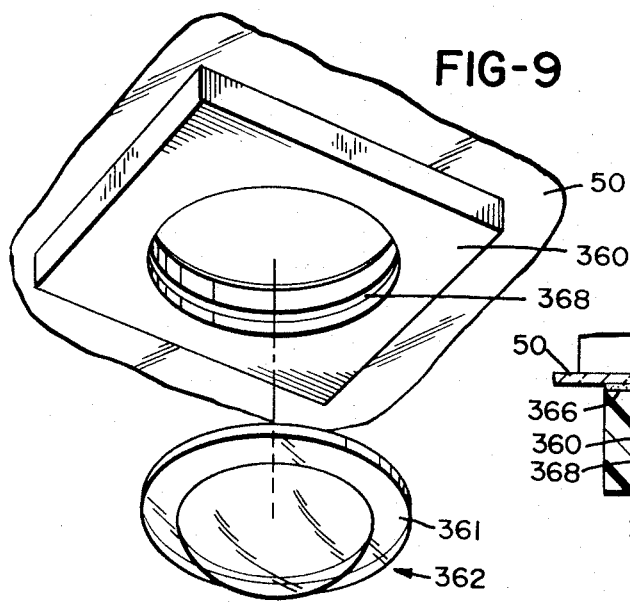
FIG. 9 is a perspective view similar to FIG. 2 showing a modification of the lens housing and lens cover.
Figure 10:
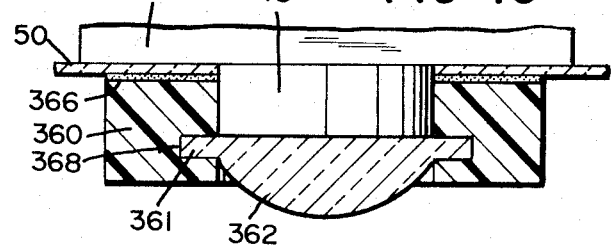
FIG. 10 is a view similar to FIG. 4 of the lens housing and lens cover of FIG. 9.

In the modification illustrated in FIGS. 9 and 10, the lens cover 362 comprises a convex central portion 362 and a substantially flat, upper peripheral lip 361 which is securely though releaseably housed within annular groove 368 of the lens housing 360. The use of a convex portion 362 of the lens cover of FIGS. 9 and 10 effectively mitigates reflection by deflecting the rays of any sidelight which would otherwise tend to enter the objective lens of the microscope housing.

Referring now to each of FIGS. 4, 6, 8 and 10, it should be understood that in those instances in which the respective ring housings and their associated lens covers are to be used separately from a microscope drape 50, the relationships between the objective lens ring 48 and the various lens ring housings and lens covers is as illustrated, except for the fact that the drapes and adhesive areas where the drapes are secured to the upper surface of the lens ring housings are deleted.

What is claimed is:

1. In a disposable microscope drape for positioning over an operating microscope in enclosing relationship thereto and comprising an elongate, continuous, substantially tubular drape open at one end and having a flexible, resilient, distortable, lens ring housing secured to and carried by the drape in a position of registry with an objective lens ring of the microscope, said housing having a central opening therethrough defining an inner wall to snugly receive said objective lens ring, said inner wall having an annular, lens cover retaining groove therein, an optically clear, distortion free lens cover snugly removably received at its outer periphery in said lens cover retaining groove in said lens ring housing in spanning relationship to said opening whereby to overlie the objective lens of said microscope, said housing having a radially extending recess therein extending from the inner wall to the outer surface thereof, and an outwardly extended manipulative handle on said lens cover which may be manually grasped to remove said cover from said housing without damaging said housing or disturbing the position of said housing when it is operatively positioned on the objective lens of a microscope, said handle received in said recess when said lens cover is positioned in said groove.

2. A device as in claim 1, wherein the housing comprises 70 Durometer PVC.

3. A device as in claim 1, wherein the lens cover comprises acrylic.

4. A device as in claim 1, wherein the housing has a front surface and a rear surface, said central opening extending from the front surface through the rear surface, and said annular groove spaced from the rear surface a distance so as to position the cover secured therein in engagement with an outer peripheral edge of the lens ring.

5. A device as in claim 4, wherein an integral, annular, axially projecting glare shield is on the front surface of said housing around said opening.

* * * * *